Dec. 23, 1924.  
E. D. McCULLOUGH ET AL  
1,520,295
WAGON AND TRUCK DUMP
Filed March 27, 1922
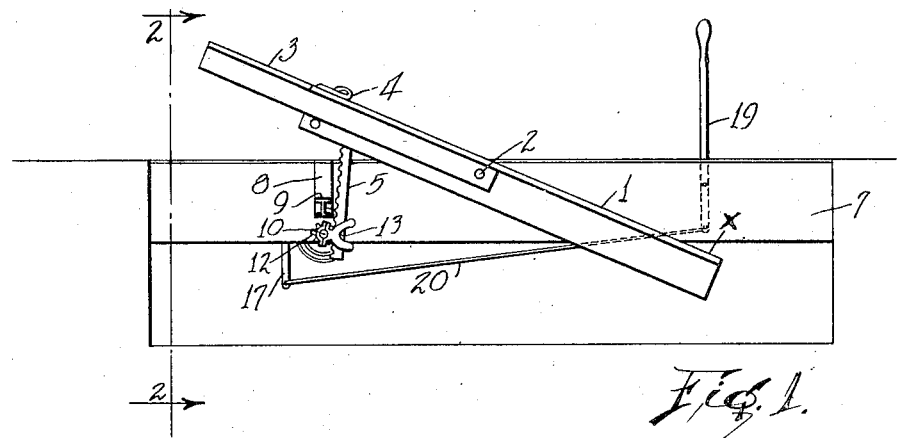
Fig. 1.
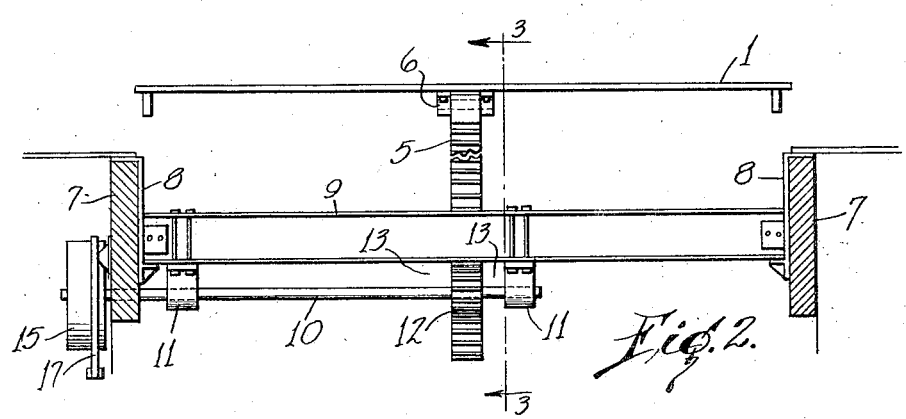
Fig. 2.
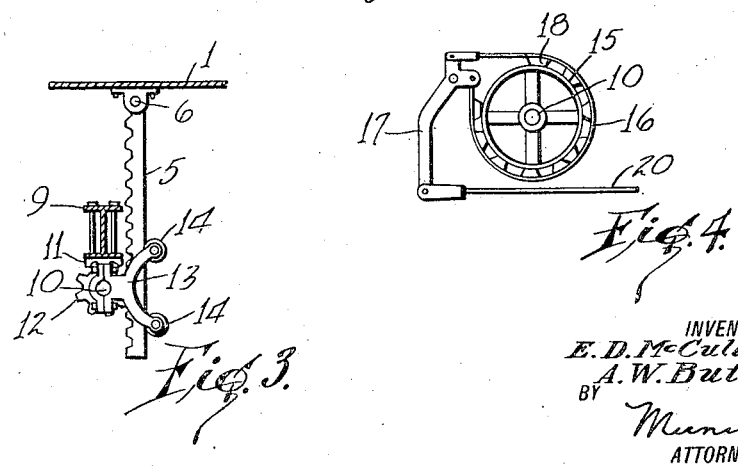
Fig. 3.
Fig. 4.
INVENTORS  
E. D. McCullough  
A. W. Butcher  
BY  
Munn & Co  
ATTORNEYS Patented Dec. 23, 1924.

1,520,295

UNITED STATES PATENT OFFICE.

ELI D. McCULLOUGH AND ARCHIE WILLIAM BUTCHER, OF SOLOMON, KANSAS, ASSIGNORS, BY DIRECT AND MESNE ASSIGNMENTS TO THE GRAVITY DUMP MANUFACTURING COMPANY, A CORPORATION OF KANSAS.

WAGON AND TRUCK DUMP.

Application filed March 27, 1922. Serial No. 547,190.

*To all whom it may concern:*

Be it known that we, ELI DAVIS McCULLOUGH and ARCHIE W. BUTCHER, both citizens of the United States, and residents of Solomon, in the county of Dickinson and State of Kansas, have invented a new and useful Improvement in Wagon and Truck Dumps, of which the following is a full, clear, and exact description.

Our invention relates to improvements in wagon and truck dumps, and it consists in the combinations, constructions, and arrangements herein described and claimed.

An object of our invention is to provide an improvement over that form of the device shown in our co-pending application, Serial No. 527,957, filed January 9, 1922. In said prior application, we showed an attachment for wagon dump, whereby the same dump can be used for dumping a wagon or a truck. The construction of the present device is primarily designed to regulate the descent of the wagon as the latter is being dumped.

A further object of our invention is to provide a device of the type described which is adapted to be attached to gravity dumps and to prevent the return of the wagon or truck being dumped before the latter is empty.

A further object of our invention is to provide a device of the type described in which the movable platform is prevented from twisting during the operation thereof.

A further object of our invention is to provide a device of the type described which may be readily attached to any truck or wagon dump.

A further object of our invention is to provide a device of the type described which is simple in construction, and which is not likely to easily get out of order.

Other objects and advantages will appear in the following specification, and the novel features of the invention will be particularly pointed out in the appended claim.

Our invention is illustrated in the accompanying drawings, forming part of this application, in which—

Figure 1 is a side elevation of the dump shown in raised position,

Figure 2 is a section along the line 2—2 of Figure 1,

Figure 3 is an enlarged detail of a portion of the device, and

Figure 4 is an enlarged detail of another portion of the device.

In carrying out our invention, we make use of the wagon and truck dump illustrated in our co-pending application. This dump comprises a swingable platform 1 which is pivotally supported at 2, and an extension 3, which is adapted to be locked with the platform 1 or to be unlocked therefrom. The extension 3 is readily locked to the platform 1 by means of the locking member 4.

Our present invention comprises a rack 5 which is pivotally secured to the platform 1 at 6 (see Figure 3). It is obvious that this rack can be attached to any dump other than that shown in the present drawing without departing from the spirit and scope of our invention. The platform 1 is carried by side beams 7 (see Figure 2), these beams in turn carrying I-beam supports 8. It will be apparent from the drawing that the supports 8 carry an I-beam 9, which in turn carries a shaft 10, the shaft being rotatably mounted in bearings 11 which are secured to the I-beam 9. The shaft 10 has a pinion 12 rigidly secured thereto, this pinion being held in mesh with the rack 5 by a frame 13.

In Figure 3, we have shown an enlarged detail of the pinion 12 and the rack 5, and how they are connected to each other. It will be observed that the frame 13 is clamped to the shaft 10 and is adapted to rotate therearound. The frame also carries idlers 14 which are adapted to engage with the smooth side of the rack 5. From this construction, it will be apparent that the rack 5 may be swung about the shaft 10 and always be held in engagement with the pinion 12, since the idlers 14 permit movement of the rack 5 with respect to the shaft 10, but always hold the rack 5 in mesh with the pinion 12. When the platform 1 is swung into the position shown in Figure 1, the rack 5 is moved upwardly, and rotates the pinion 12 in the shaft 10.

In the present instance, we have shown the rack 5 and pinion 12 operatively connected to a dump which is operated by gravity. It will be apparent that when a load is disposed on the platform 1, the heavier part of the load will be disposed at the point x of the platform 1, and will therefore cause the platform 1 to swing into the position shown in Figure 1 when the platform is released. Since the weight of the load is relatively great, the platform 1 will be quickly swung into open position unless it is controlled by some braking means, which is carried by the shaft 10, and which In Figure 4, we have shown a novel brake is adapted to effectually control the rotation of the shaft 10. This brake comprises a brake wheel 15, around which is disposed a brake band 16. It will be observed that the ends of the brake band 16 are secured to a brake lever 17, whereby movement of the brake lever 17 will cause the brake band 16 to contract and to retard the movement of the wheel 15. The brake band 16 is provided with inwardly extending lugs 18 which are adapted to frictionally engage the outer periphery of the wheel 15. The free end of the lever 17 is connected to a manually controlled lever 19 by means of a cable 20. It is obvious that the lever 19 may thus control the movement of the platform 1 in its descent with a load.

From the foregoing description of the various parts of the device, the operation thereof may be readily understood. Assume that the platform 1 is in closed position and that a truck having a load of grain therein is desired to be dumped. The locking lever 4 is swung so as to connect the extension 3 with the platform 1, thus causing the extension 3 to become a part of the platform 1 and to swing with the latter. It will be apparent that the greatest weight of the truck will be at the rear end thereof, and that since this end is disposed above the portion marked x of the platform 1, the platform will tend to swing into the position shown in Figure 1. As soon as the platform is released, the weight of the truck will cause the platform to swing. The descent of the truck may be regulated at will by merely grasping the lever 19 and applying the brake to the shaft 10 as much as desired. Ordinarily, the platform 1 would swing downwardly with great force, and would tend to damage the platform 1. By applying the brake, however, to the platform 1, the descent may be so regulated that the truck will be brought to an easy stop after its descent.

It will also be apparent that in gravity dumps of ordinary construction, the dump would tend to return to normal position before the load in the truck was entirely emptied, since the greater weight of the truck would be transferred from the rear end when it is full, to the front end when it is nearly empty. This return movement of the platform 1 can be prevented by merely applying the brake to the shaft 10. When the truck is entirely empty, the brake may be released so as to permit the platform 1 to resume its normal position. In the same manner as the brake determined the descent of the platform 1, it determines the ascent of the platform 1 to normal position. Since the rack 5 is disposed in the center of the platform 1, it will tend to prevent any lateral movement of the platform 1, due to uneven loads carried thereby.

From the foregoing it will be observed that we have provided a simple device which may be readily attached to any dump, and which is especially adapted to be used with gravity dumps. It will further be observed that our device puts the entire operation of the dump into the complete control of the operator, whereby the movement of the platform can be regulated at will. As heretofore stated, the device is simple in construction, and is durable and efficient for the purpose intended.

We claim:

A gravity actuated wagon dump comprising a frame, a dump carried by said frame, a rack pivotally carried by said dump, a pinion, a support for said pinion carried by said frame, a shaft rigidly secured to said pinion, a brake mounted on said shaft, a bracket mounted on said shaft, two rollers carried by said shaft and being spaced from each other and from the shaft, said rollers adapted to hold said rack in mesh with said pinion and to prevent said bracket from moving with respect to said rack, whereby a binding action between the bracket and rack is obviated.

ELI D. McCULLOUGH.
ARCHIE WILLIAM BUTCHER.